No. 885,642. PATENTED APR. 21, 1908.
E. A. OSTERHOUT.
BAIT HOLDER.
APPLICATION FILED JULY 8, 1907.
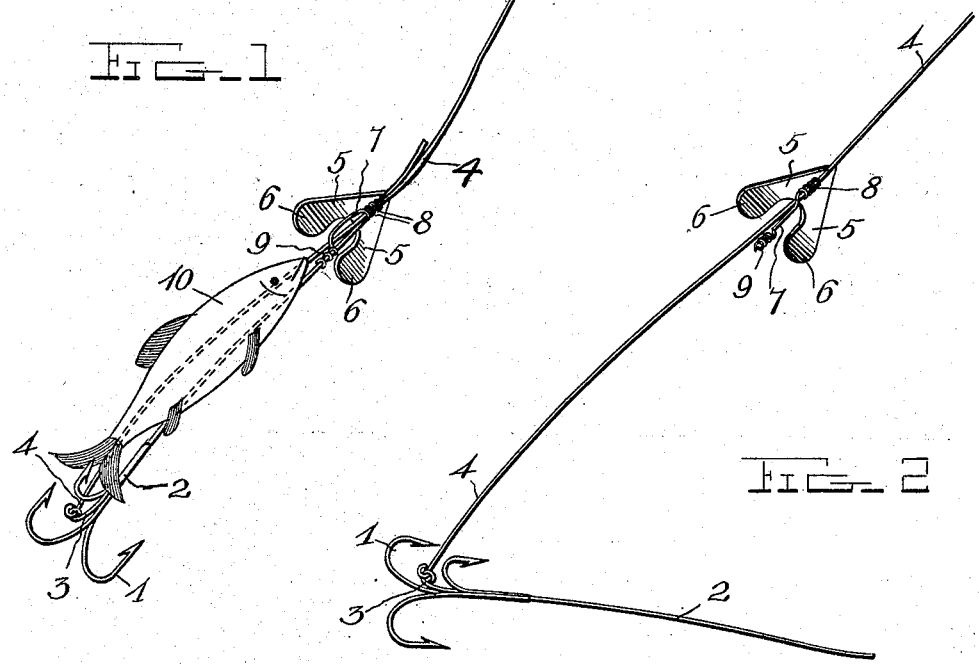
Witnesses
Inventor
E. A. Osterhout
by H. B. Willson & Co.
Attorneys

UNITED STATES PATENT OFFICE.

EDDIE A. OSTERHOUT, OF ILION, NEW YORK.

BAIT-HOLDER.

No. 885,642.   Specification of Letters Patent.   Patented April 21, 1908.

Application filed July 8, 1907. Serial No. 382,690.

*To all whom it may concern:*

Be it known that I, EDDIE A. OSTERHOUT, a citizen of the United States, residing at Ilion, in the county of Herkimer and State of New York, have invented certain new and useful Improvements in Bait-Holders; and I do declare the following to be a full, clear, and exact description of the invention, such as will enable others skilled in the art to which it appertains to make and use the same.

This invention has relation to new and useful improvements in bait holders and has for its object to provide simple and economical means whereby bait, such as worms, minnows or the like may be easily and readily placed on or removed from position on a fish hook.

With the foregoing and other objects in view which will appear as the nature of the invention is better understood, the invention consists in certain novel features of construction, combination and arrangement of parts as will be hereinafter fully described and claimed.

In the accompanying drawings, Figure 1 is a perspective view of a bait holder constructed in accordance with the invention with the bait in position; Fig. 2 is a perspective view, the bait removed; and Fig. 3 is an enlarged detail perspective view of a rotary plate constituting one of the elements of the invention.

As shown in the drawings, the fish hook 1 which may be of any suitable form or well-known construction is provided near the inner end of its stem or shank 2 with an obliquely extending eyed extension 3. A supporting wire 4 is loosely connected at one end in the eye of said extension 3 and is adapted for connection or attachment to a fish line at its opposite end. A flat bait plate having an illuminating or light colored face comprises two diverging arms or members 5 bent in opposite directions to form oppositely bent blades 6. A fastening wire 7 is bent or turned at one end to form a longitudinally disposed coil 8 and is soldered at said end to one face of the bait plate and serves as a means for fastening the plate to the supporting wire, this wire being threaded through the longitudinal coil 8. The free or opposite end of the fastening wire is bent or turned to form a coil 9 adapted to receive the stem or shank 2 of the fish hook.

In practice, the bait 10 is placed on the stem and the free end of the stem secured in position to the supporting wire by passing it through the coils 8 and 9 of the fastening wire, holding the bait in position.

From the foregoing description, taken in connection the accompanying drawings, the construction and operation of the invention will be readily understood without requiring a more extended explanation.

I claim as my invention:—

1. In a bait holder, the combination with a fish hook of a supporting wire, loosely connected at one end thereof and adapted for attachment with a fishing line at its opposite end and fastening means sustained by and removable longitudinally of the supporting wire for maintaining the hook shank removably connected with the wire.

2. In a bait holder, the combination with a fish hook of a supporting wire loosely connected thereto, and adapted for attachment to a fish line, a bait plate comprising flat diverging arms bent in opposite directions at their outer ends to form oppositely extending blades sustained by and removable longitudinally of the supporting wire, and means for removably connecting the hook shank with the fastening wire.

3. In a bait holder, the combination with a hook having an extension near the inner end of its shank, of a supporting wire loosely connected to the extension at one end adapted for attachment to a fishing line at its opposite end, a bait plate comprising flat diverging arms bent in opposite directions at their outer ends to form oppositely extending blades carried by and movable longitudinally of the supporting wire and means for removably connecting the hook shank in position to the fastening wire.

4. In a bait holder of the character described, the combination with a hook having an eyed extension at the inner end of its shank, of a supporting wire loosely connected in the eye of the extension and adapted for attachment at its opposite end, to a fishing line, and fastening means sustained by and movable longitudinally of the supporting wire for maintaining the shank of the hook removably connected with the wire.

5. In a bait holder of the character described, the combination with a hook, of a supporting wire attached near the inner end of the shank thereof, a rotary bait plate comprising flat diverging arms bent in opposite directions at their free ends to form blades removably sustained by the supporting wire and a fastening wire having longitudinally disposed coils at its ends adapted to receive the shank of the hook to maintain it removably connected with the supporting wire, one of the coils serving as a fastening means for the rotary plate.

In testimony whereof I have hereunto set my hand in presence of two subscribing witnesses.

EDDIE A. OSTERHOUT.

Witnesses:
    FRANK A. SCHMIDT,
    THEODORE W. SCHMIDT.